United States Patent [19]

Aziz et al.

[11] 4,082,728
[45] Apr. 4, 1978

[54] XYLENE-FORMALDEHYDE RESIN COMPOSITIONS AND PROCESS

[75] Inventors: Walid Y. Aziz, Warrensville; Lawrence E. Ball, Cuyahoga Falls; Irving Rosen, Warrensville Heights, all of Ohio

[73] Assignee: The Standard Oil Company, Cleveland, Ohio

[21] Appl. No.: 716,545

[22] Filed: Aug. 23, 1976

[51] Int. Cl.² ............................................. C08G 10/02
[52] U.S. Cl. ................................... 260/67 A; 260/823
[58] Field of Search ............................. 260/67 A, 823

[56] References Cited

U.S. PATENT DOCUMENTS

| | | | |
|---|---|---|---|
| 2,597,159 | 5/1952 | May et al. | 260/67 A X |
| 3,372,147 | 3/1968 | Heinrich et al. | 260/67 A |
| 3,378,466 | 4/1968 | Coltharp et al. | 260/67 A X |
| 3,700,640 | 10/1972 | Cier | 260/67 A |

FOREIGN PATENT DOCUMENTS

| | | | |
|---|---|---|---|
| 1,015,891 | 1/1966 | United Kingdom | 260/67 A |

OTHER PUBLICATIONS

Encyclopedia of Polymer Science and Technology, vol. 7, pp. 539–557.

*Primary Examiner*—Lucille M. Phynes
*Attorney, Agent, or Firm*—John F. Jones; Larry W. Evans

[57] ABSTRACT

Light colored, high molecular weight thermoplastic xylene-formaldehyde polymers are prepared by reaction of substantially equimolar amounts of xylene and formaldehyde in the presence of a strong acid catalyst by the exclusion of air from the reactor.

11 Claims, No Drawings

XYLENE-FORMALDEHYDE RESIN COMPOSITIONS AND PROCESS

The present invention relates to thermoplastic xylene-formaldehyde resin compositions and to their method of manufacture, and more particularly pertains to thermoplastic, high molecular weight, high softening light colored xylene-formaldehyde polymers having low oxygen content, and to the closed system process for their manufacture.

The production of xylene-formaldehyde polymers which contain controlled amounts of oxygen in the range of from about 3 to 18% by weight and are thermosetting by the reaction of xylene and formaldehyde at elevated temperatures with an acid catalyst has been described previously, see for instance U.S. Pat. Nos. 3,700,640, 3,372,147, 3,378,466 and the "Encyclopedia of Polymer Science and Technology", Volume 7, pages 539–557.

The present invention involves the production of high molecular weight (20,000 and above) xylene-formaldehyde resins which are thermoplastic, contain little or no oxygen (less than 2% by weight), are light in color or colorless (Gardner color of less than about 5), and have extremely high softening points or glass transition temperatures (120° C. and above) by the reaction of xylene, preferably m-xylene, and formaldehyde or a formaldehyde-yielding material at an elevated temperature in the range of from about 60° to 200° C. in the presence of an acid catalyst in a closed system from which molecular oxygen is preferably excluded. Substantially equal molar amounts of xylene and formaldehyde are preferred for use in the manufacture of the resins of this invention.

Although the general term "xylene-formaldehyde resin" is commonly used to identify such products, they are almost exclusively derived from m-xylene and formaldehyde. Typically, the $C_8$ aromatic hydrocarbon fractions from petroleum reforming contain mixed xylene isomers and ethyl benzene. The isomer distribution is fixed within certain limits by thermodynamic equilibria, which favor the formation of m-xylene in at least twice the amount of the o- and p-xylene isomers. For example, a typical commercial $C_8$ aromatic petroleum fraction has the following isomer distribution: o-xylene, 21%; m-xylene, 40%; p-xylene, 18%; and ethyl benzene, 21%. Fortunately, the greater abundance of m-xylene in $C_8$ aromatic hydrocarbon mixtures coincides with its higher reactivity (compared with other $C_8$ aromatic isomers) in acid-catalyzed poly condensation reactions with formaldehyde. Therefore, xylene-formaldehyde resins can be produced commercially at low cost from mixed xylene, while concurrently facilitating the separation of the more valuable o- and p-isomers as well as ethyl benzene. The latter isomers are now being produced on a large scale to fulfill the rapidly expanding demand for terephthalic acid, dimethyl terephthalate, phthalic anhydride, and styrene. Although m-xylene is used commercially for the preparation of isophthalic acid and its derivatives, the present commercial market for these materials is comparatively small; consequently, there is great incentive to find new uses for m-xylene.

In place of formaldehyde, other forms of formaldehyde such as formalin, paraformaldehyde, trioxane, or other formaldehyde-yielding materials may be used advantageously in the process of this invention.

The acid catalyst useful in this invention may be any strong acid having a $pk_a$ in the range of from −1 to −11 such as sulfuric acid, any of the halogen acids including hydrogen fluoride, hydrogen chloride, hydrogen bromide and hydrogen iodide, perchloric acid, boron trifluoride, aluminum chloride, phosphoric acid, pyrophosphoric acid, acetic acid, the chloroacetic acids, chloromaleic acid, p-toluene sulfonic acid, and other well known organic and inorganic acids including the so-called Lewis acids. The most preferred acid catalysts are perchloric acid and sulfuric acid in the present invention because of their good activity and the resins produced using these acids, are of good color and high molecular weight. Acid catalyst is used in from 0.5 to 5% by weight based on the combined weight of xylene and formaldehyde used.

The xylene-formaldehyde resins of the prior art generally possessed molecular weights of 200 to 1000, oxygen content of from 8 to 18% and varied in consistency from pale yellow to dark amber mobile liquids to viscous semisolids which contained considerable amounts of oxygen. The xylene-formaldehyde resins of the present invention, on the other hand, have molecular weights greater than 20,000 and are solids of relatively light color containing essentially no oxygen in them.

The resins produced in accordance with this invention are useful in the manufacture of molded plastic articles such as bottles, cups, plates, boxes, and the like and they are particularly useful for blending with well-known plastic materials such as polystyrene, polymethyl methacrylate, polymethyl acrylate, polyvinyl acetate, polyindene, polycarbonate, acrylonitrile copolymers, polyvinyl chloride, polyolefins, and the like, for upgrading these materials insofar as softening temperature and creep resistance is concerned. Because of their relative low cost the resins of this invention when blended with more conventional plastics also have the advantage of lowering the overall cost of the blends.

The resins of this invention are prepared in a closed system by either a single stage or two stage reaction as more fully described in the examples.

In the closed system two step reaction, for instance, the condensation of m-xylene with formaldehyde is usually accomplished in a glass lined vessel (Pyrex resin kettle) equipped with a gas tight stirrer, gas tight ports and thermometer. Controlled heating is accomplished by an electrical heating mantle or oil bath. The reaction ingredients are placed in the resin kettle, the reactor is completely sealed off from the atmosphere (no material or gas inlet or outlet).

A Dean-Stark distilling receiver is added to the reaction kettle with a reflux condenser after the reaction mentioned above is completed. The temperature of the mixture in the kettle is then raised to 115° C. and water is recovered in the receiver. As the viscosity of the material in the kettle increases the temperature is raised slowly to 160° C. or higher. Final resins having molecular weights above 20,000 are obtained in better than 98% conversion. The resulting polymer is recovered as a hot liquid which is cooled and dissolved in benzene. The benzene solution is filtered and the benzene-soluble resin is precipitated with addition of methanol to the benzene solution.

The foregoing closed system process differs from the prior art open system methods which have no precautions against exposure to the atmosphere in the reaction step described above.

In the following illustrative examples the amounts of ingredients are expressed in parts by weight unless otherwise specified.

EXAMPLE 1

A high molecular weight, light-colored polymer containing essentially no oxygen was prepared from m-xylene and paraformaldehyde using the following ingredients:

| Ingredient | Moles | Grams |
|---|---|---|
| m-xylene | 2 | 212 |
| paraformaldehyde | 2 | 63.15 |
| perchloric acid 60% pure | 2% by weight of monomers | 9.19 |

The m-xylene was placed in a reactor and was stirred for about 15 minutes under a nitrogen purge. The paraformaldehyde was then added, the mixture was heated with continued stirring to 90° C. under a closed system (i.e., no air from the atmosphere was allowed to enter the reaction system). When the reaction mixture reached 90° C, the perchloric acid was added. After 3 hours, the system was opened and a side arm and reflux condenser were added for the collection of water. The degree of conversion was determined by measurement of the water removed. At 92% conversion, a nitrogen purge was reinstated and a final conversion of 98.83% was obtained. The resulting polymer was dissolved in benzene and was coagulated with methanol, filtered and vacuum dried for 48 hours at 50° C. The final polymer was a glassy solid having the following properties:

| | |
|---|---|
| softening point | 165° C |
| Tg (glass transition temperature by DTA) | 123° C |
| molecular weight | 20,400 |
| oxygen content | 0.68% |
| Gardner color | 2 |
| Brabender Plasticorder Torque at 35 RPM | 830–650 meter grams in 13 minutes at 180° C |
| intrinsic viscosity at 25° C in benzene | 0.12 |
| Shore D hardness | 84 |

The resin was found to be soluble in benzene, tetrahydrofuran, dimethyl formamide, p-dioxane, trichloroethylene, toluene and chloroform. In this and the succeeding examples the molecular weight of this resin was determined on a solution of the resin in benzene using vapor pressure osmometry with a Hewlett Packard instrument. The number average molecular weight thus obtained was multiplied by two to give the weight average molecular weight reported above.

EXAMPLE 2

A m-xylene-formaldehyde resin which is outside the scope of this invention was prepared using an excess of formaldehyde and an open system and the following ingredients:

| Ingredient | Moles | Grams |
|---|---|---|
| m-xylene | 2 | 212 |
| paraformaldehyde | 5 | 150 |
| perchloric acid | 0.0636 | 10.6 |

The ingredients were put in the reactor, reflux was carried out with stirring at 95° C and the water formed in the condensation was collected by means of a reflux head and side arm. The reaction was carried out for 4½ hours giving a conversion of 95%. The resin was isolated as an Example 1 and the resin was found to have the following properties:

| | |
|---|---|
| softening point | 115° C |
| molecular weight | 2,000 |
| oxygen content | 9.08% |
| % insolubles in benzene | 5 |
| Rockwell hardness (Shore D hardness) | 72 |
| Gardner color | >18 (black, opaque) |
| Brabender Plasticorder | Not processable |

EXAMPLE 3

This example illustrates a two-step process for preparing thermoplastic m-xylene-formaldehyde resins of low oxygen content which are within the scope of the present invention.

A. The following ingredients were used in the first step:

| Ingredient | Moles | Grams |
|---|---|---|
| m-xylene | 6 | 636 |
| paraformaldehyde | 6 | 185 |
| perchloric acid | 3% by weight of monomers 60% purity | 41.13 |

The m-xylene and paraformaldehyde were placed in the reactor and the mixture was stirred and brought to 90° C with nitrogen purging from which air is excluded during the reaction in a closed system. The perchloric acid was then added and the reaction temperature was brought to about 115° C. The reaction was carried out in a closed system for 5 hours. The water was removed as in the preceding examples and the resulting polymer was dissolved in benzene, precipitated with methanol and dried and was found to have the following properties:

| | |
|---|---|
| softening point | 130° C |
| Tg (glass transition temperature by DTA) | 96° C |
| molecular weight | 4000 |
| oxygen content | 1.94% |
| Gardner color | 3 |
| Brabender Plasticorder torque | 90–60 meter grams in 13 minutes at 180° C |

B. The resin from A of this example was reacted further with formaldehyde by putting 10 grams of the resin from A, 2 grams of paraformaldehyde, 0.5 gram of perchloric acid, and 50 grams of methylene chloride in a reactor at 60° C for 12 hours. The soluble polymer was coagulated with methanol and vacuum dried at 45° C for 48 hours producing a polymer having the following properties:

| | |
|---|---|
| softening point | 200° C |
| Tg | 170° C |
| molecular weight | 25,000 |
| oxygen content | 0.75% |
| Gardner color | 3 |
| Shore D hardness | 80 |
| Brabender Plasticorder torque | 500–420 meter grams in 20 minutes at 230° C |

The resin was found to be completely soluble in benzene, tetrahydrofuran, dimethyl formamide, toluene, p-dioxane, and trichloroethylene.

EXAMPLE 4

The resin described in Example 1 was blended with a commercially available polystyrene in the weight ratio of 75 grams of polystyrene to 25 grams of the m-xylene-formaldehyde resin. The blend was made in a Brabender internal mixer. Properties of the blend versus the properties of the polystyrene are given below.

|  | Polystyrene | Blend |
| --- | --- | --- |
| ASTM heat-distortion temperature | 84° C | 98° C |
| Tg | 98° C | 108° C |
| flexural strength | $4.53 \times 10^3$ | $5.2 \times 10^3$ |
| flexural modulus | $4.04 \times 10^5$ | $4.62 \times 10^5$ |
| tensile strength | $5.57 \times 10^3$ | $5 \times 10^3$ |
| Rockwell M hardness | 65 | 83 |
| Brabender torque (200° C) | 1160–915 meter grams | 815–620 meter grams |
| water vapor transmission rate (gm-mil/100CC$^2$/ 24 hrs/atm units) | 8.5 | 6 |

The blend was clear, transparent and virtually colorless.

EXAMPLE 5

A polymer of m-xylene and formaldehyde having relatively low molecular weight and excessive oxygen which is outside the scope of the present invention was prepared from the following ingredients:

| Ingredient | Moles | Grams |
| --- | --- | --- |
| m-xylene | 2.0 | 212 |
| paraformaldehyde | 2.0 | 63.15 |
| perchloric acid | 2% (60% pure) | 9.19 |

The m-xylene and formaldehyde were placed in a reaction vessel and with stirring were brought to a reaction temperature of 90° C. at which point the perchloric acid was added. The reaction mixture was left open to the atmosphere. The reaction vessel contained a side arm and reflux condenser and the escape of some of the formaldehyde from the condenser was observed. After no more water was observed coming over in the side arm (about six hrs.) the final polymer remaining in the reaction vessel was cooled and dissolved in benzene and coagulated with methanol. The solid product was dried at 45° C in a vacuum oven for 48 hours. The polymer was found to have the following properties:

| softening point | 110° C |
| --- | --- |
| Tg | 100° C |
| molecular weight | 3176 |
| percent oxygen | 2.55 |
| Gardner color | >18 |
| intrinsic viscosity[η] in benzene - 25° C | 0.035 |
| percent insolubles in benzene | 18.20 |

EXAMPLE 6

Another polymer of m-xylene and formaldehyde which is outside the scope of the present invention was prepared using the following ingredients:

| Ingredient | Moles | Grams |
| --- | --- | --- |
| m-xylene | 2.0 | 212 |
| paraformaldehyde | 2.0 | 60 |
| formic acid | 4.0 | 184 |

The formic acid and paraformaldehyde were addid to a reaction vessel and the mixture was heated with stirring to 80° C. at which time 10 ml m-xylene was added to the mixture. Additional 10 mls of m-xylene was added every five minutes and the reaction temperature was maintained at 80°–85° C. The reaction was run in accordance with U.S. Pat. No. 2,597,159. After the m-xylene was all added, the reaction temperature was raised to 100° to 105° C. and reflux was maintained for seventeen hours. The resulting polymer was found to have the following properties:

| molecular weight | 532 |
| --- | --- |
| oxygen content | 3.81% |
| Gardner color | 2 |

EXAMPLE 7

A copolymer of xylene and formaldehyde which is within the scope of this invention was prepared from the following ingredients:

| Ingredient | Moles | Grams |
| --- | --- | --- |
| m-xylene | 2.0 | 212 |
| paraformaldehyde | 2.2 | 69.45 |
| $H_2SO_4$ | 0.056 | 5.5 |

The m-xylene was charged to the polymerization reactor, stirring was started and the system was purged with nitrogen for fifteen minutes. Two moles of paraformaldehyde (63.15 g.) were added to the reactor at 65° C. The sulfuric acid was then added and the temperature of the reaction mixture was raised to 95° C. The reaction was carried out in closed system (no exposure to air of the atmosphere) for three hours at 95° C. At this point a side arm and condenser were installed in the reactor and the temperature of the reaction mixture was brought to 115° C. and water was removed through the side arm. As the viscosity of the reaction mixture increased the temperature of the reaction mixture was increased about 10° C. each hour. At the end of 4½ hours or 65% conversion an additional 3.15 grams or 0.1 mole of paraformaldehyde were added to the reaction mixture and the same amount was added again at 80% conversion. The reaction was continued to high viscosity at a temperature exceeding 160° C. The resulting polymer remaining in the reactor was cooled and dissolved in benzene. The polymer was isolated by precipitation from the benzene solution by the addition of methanol and the recovered solid was vacuum dried at 45° C. for 48 hours. A 98.6% conversion was achieved and the polymer was found to have the following properties:

| softening point | 185° C. |
| --- | --- |
| Tg | 145° C. |
| Gardner color | 3–4 |
| molecular weight | 27,000 |
| viscosity 25° C. in benzene | 0.14 |
| oxygen content | 0.97% |
| Brabender plasticorder torque - 35 RPM | 1250 meter grams after 20 minutes at 190° C. | optical properties of resin after 20 minutes at 190° C. in Brabender plasticorder at 35 RPM

| | |
|---|---|
| % transmission | 71 |
| yellowness index | 52.9 |
| haze | 26.5% |
| thickness of sample | 26 mil |

We claim:

1. The process for preparing solid light colored, containing less than 2% oxygen by weight thermoplastic xylene-formaldehyde polymers having a molecular weight greater than 20,000 comprising reacting formaldehyde or a formaldehyde producing material with m-xylene in the presence of an acid catalyst at an elevated temperature in a closed reactor from which air is excluded during the reaction.

2. The process of claim 1 wherein xylene is m-xylene.

3. The process of claim 2 wherein the acid catalyst has a $pK_a$ in the range of from $-1$ to $-11$ and is present in the range of from 0.5 to 5% by weight based on the combined weight of m-xylene and formaldehyde or formaldehyde producing material.

4. The process of claim 3 wherein the formaldehyde producing material is paraformaldehyde.

5. The process of claim 4 wherein substantially equimolar quantities of m-xylene and formaldehyde or paraformaldehyde are used.

6. The process of claim 4 wherein the acid catalyst is one selected from the group consisting of sulfuric acid and perchloric acid.

7. The process of claim 5 wherein the acid catalyst is sulfuric acid.

8. The process of claim 5 wherein the acid catalyst is perchloric acid.

9. The polymer composition prepared by the process of claim 1 having a glass transition temperature of at least 120° C. and a Gardner color no greater than 5.

10. A blend composition comprising from 75:25 to 25:75 weight ratio of
    (A) the polymer composition of claim 9, and
    (B) at least one member selected from the group consisting of polystyrene, polymethyl methacrylate, polymethyl acrylate, polyvinyl acetate, polyindene, polycarbonate, polyvinyl chloride, vinyl chloride copolymers, polyethylene, polypropylene and acrylonitrile copolymers.

11. The blend of claim 10 wherein (B) is polystyrene.

* * * * *